United States Patent [19]

Bloomfield

[11] Patent Number: 5,404,231
[45] Date of Patent: Apr. 4, 1995

[54] SENDER-BASED FACSIMILE STORE AND FORWARD FACILITY

[75] Inventor: Mark C. Bloomfield, Marietta, Ga.
[73] Assignee: Audiofax, Inc., Marietta, Ga.
[21] Appl. No.: 65,984
[22] Filed: May 24, 1993
[51] Int. Cl.$^6$ .............................................. H04N 1/00
[52] U.S. Cl. .................................. 358/400; 358/405; 358/407; 358/440
[58] Field of Search ............... 358/400, 402, 403, 405, 358/407, 435, 436, 438, 439, 440

[56] References Cited

U.S. PATENT DOCUMENTS

| | | | |
|---|---|---|---|
| 4,058,672 | 11/1977 | Crager et al. | 358/257 |
| 4,571,699 | 2/1986 | Herzog et al. | 364/900 |
| 4,584,434 | 4/1986 | Hashimoto | 179/2 A |
| 4,613,907 | 9/1986 | Yoshimoto et al. | 358/257 |
| 4,614,978 | 9/1986 | Doster et al. | 356/263 |
| 4,642,697 | 2/1987 | Wada | 358/439 |
| 4,646,160 | 2/1987 | Iizuka et al. | 358/402 |
| 4,654,718 | 3/1987 | Sueyoshi | 358/257 |
| 4,660,218 | 4/1987 | Hashimoto | 379/93 |
| 4,870,678 | 9/1989 | Adachi | 358/434 |
| 4,893,333 | 1/1990 | Baran et al. | 379/100 |
| 4,905,273 | 2/1990 | Gordon et al. | 379/93 |
| 4,918,722 | 4/1990 | Duehren et al. | 379/100 |
| 4,935,955 | 6/1990 | Neudorfer | 379/100 |
| 4,941,170 | 7/1990 | Herbst | 379/100 |
| 4,967,288 | 10/1990 | Mizutori et al. | 358/425 |
| 4,974,254 | 11/1990 | Perine et al. | 379/100 |
| 4,994,926 | 2/1991 | Gordon et al. | 358/400 |
| 5,008,926 | 4/1991 | Misholi | 379/89 |
| 5,065,254 | 11/1991 | Hishida | 358/406 |
| 5,136,634 | 8/1992 | Rae et al. | 379/100 |

FOREIGN PATENT DOCUMENTS

| | | | |
|---|---|---|---|
| 58-165452 | 9/1983 | Japan | H04N 1/00 |
| 58-186253 | 10/1983 | Japan | 358/403 |
| 59-214365 | 12/1984 | Japan | H04N 3/42 |
| 59-231964 | 12/1984 | Japan | H04N 1/00 |
| 60-119164 | 6/1985 | Japan | 379/100 |
| 62-53545 | 3/1987 | Japan | H04L 1/00 |
| 64-1364 | 1/1989 | Japan | H04N 1/00 |
| 1258526 | 10/1989 | Japan | H04L 11/20 |
| 2211698 | 7/1989 | United Kingdom | 379/98 |

OTHER PUBLICATIONS

"A Message Handling System for Public Networks" Nakayama et al. ACM Eighth Data Communications Symposium, vol. 13 No. 4 pp. 103, 111, 1983.

(List continued on next page.)

Primary Examiner—Stephen Brinich
Assistant Examiner—Jerome Grant, II
Attorney, Agent, or Firm—Louis T. Isaf; Jeffrey R. Kuester

[57] ABSTRACT

A facility which, in its most preferred method and apparatus embodiments, enhances facsimile communication through a public switched telephone network between a sender at a transmitting facsimile machine and an intended recipient at a receiving facsimile machine by providing sender-based store and forward services which help ensure confidential, timely delivery of facsimile information through, for any particular facsimile transaction, analyzing sender facsimile bitmapped image data to confirm billing availability and recognize a notification facsimile telephone number and a confirmation facsimile telephone number, transmitting generated notification facsimile data to a facsimile machine at the notification facsimile telephone number to produce a notification report providing notification of pending, available confidential facsimile data, transmitting sender facsimile data to a receiving facsimile machine during a telephone call from an intended recipient at the receiving facsimile machine upon receiving a valid confidential retrieval code from the intended recipient, and subsequently transmitting generated confirmation facsimile data to a facsimile machine at the confirmation facsimile telephone number to produce a delivery confirmation report suggesting delivery not only to a facsimile machine, but to the intended recipient, wherein the confidential retrieval code is randomly generated and shown on the notification report unless supplied by the sender with the sender facsimile data, and wherein a monitoring service is provided whereby delivery status information is made available to the sender.

5 Claims, 15 Drawing Sheets

OTHER PUBLICATIONS

Advanced Facsimile Communication Network, Ejiri, 11B830700, pp. 178–18198.

"An Answering Machine That Really Gives Answers", Deidre A: Depke, Oct. 9, 1989.

Audiofax, Inc. Proposal for Bellsouth Advanced Networks Facsimile Automated and On–Demand Distribution Methods–Oct. 6, 1988, pp. 1–26.

CCITT, "Telematic Services: Operations and Quality of Service" Recommendations F. 162, vol. II, Sections 1–10, 1984.

Trilogue Message Management Systems, Comverse Technology, Inc.

Control Methods for Facsimile Store and Forward Communication Services, IEEE/IEICE, Conference Record.

Design for facsimile Storage and Conversion Processing STDC–201, Shimamura et al, vol. 33 No. 1, 1985.

Development of a Multimedia MHS Based on CCITT X400 Recommendations "Computer Message Systems'–'–BS Elsevier Science Publ., 1986

"Development of a Public Facsimile Communication System Using Storage and Conversion Techniques" pp. 19.4, 1–5, 1980.

"Development of Fax Communication System for Packet Switched Data Network" International Conference vol. 2 of 4, 1981.

Enhanced Fax Communication Network, Japan Telecommunications Review pp. 30–35, Jan. 1986.

Fax Controller–Smart–1 SPC Fax Dialer–Mitel Enterprises, Nov. 1991.

Audiofax, Inc. Fax Management System Description, Jul. 1991, Release 1.5 pp. 1–Index–4.

FAX/PAK Facsimile Transmission Service, Universal Compatibility Between Fax Machines, The Next Breakthrough, Service Features.

Fax Master 21 Remote Operation, What is Remote Operations? How to Set Up Fax Master for Remote Operations pp. 1–61, Fax Master 21 Handbook.

Faxmaster Made Easy To: Distribution From: Mike Donnenfield Jun. 9, 1985, Internal Memo.

Feigenbaum "Information Disclosure Statement for 192,839", Apr. 1990 U.S. Pat. No. 4,918,722 file History.

The Fax Network–Intelligent Communications Module (ICM) Product Specification, May 11, 1992.

Interfax's Unique Fax Service, May 1990, pp. 58–59, "Teleconnect MCI Safe (R) Store–and–Forward Message Switching" System.

User's Guide Standard Asyrchronous Access (inpart) Public Fax Communication Network IEEE Comm. Magazine 8203 p. 47 et seq. 1982.

"Smart Fax Mailbox Manager from Electron System Specifications for Bell South Advanced Networks", Nov. 28, 1988, Fax Automated and On–Demand Distribution Methods.

ATR 300–Telephone Line Powered Call Controller for Routing Calls Transparently to Alternative Long Distance Carriers Trilogue Hardware Architecure–Comverse Technology, Inc. 1987.

FAX EXPRESS

DELIVERY REPORT

WAYBILL TRACKING NUMBER:
2486929915

Report Date, Time
12/18/92 [12:55 p.m. EST]

Please Hand Deliver Immediately to Addressee

| Addressee Name | Company | Voice Phone Number | Dept/Fl. No./Ext. | Fax Number |
|---|---|---|---|---|
| JEFF KUESTER | ISAF & KUESTER | (407) 355-9122 | 325 | (407) 912-9715 |

*Fax Delivery/Confirmation Information*

| Recipient Name | Company | Voice Phone Number | Dept/Fl. No./Ext. | Fax Number |
|---|---|---|---|---|
| MARK BLOOMFIELD | AUDIOFAX | (404) 618-4224 | | (404) 618-4524 |

1. Internal Reference Information: Audiofax Patent
2. Original Date/Time Document was Sent: 12/13/92 [10:55 a.m. EST]
3. Originating Fax Number: (407) 355-9123
4. Number of Pages in Fax: 4
5. Recipient Notification Date/Times: 12/13/92 [10:59 a.m. EST]
   12/13/92 [12:45 p.m. EST]
   12/13/92 [12:52 p.m. EST]
6. Recipient Retrieval Date/Time:
7. Retrieval Fax Phone Number: (404) 933-7606

NON DELIVERY
In the event your fax document has not been successfully delivered to the intended recipient, you may either resend a Fax Notification to the recipient or you may terminate the pending fax delivery. To perform either one of these options, dial 800-233-4540 from any touchtone phone and follow the voice instructions. Have your Waybill Tracking Number handy.

WARNING! If the fax document continues to go undelivered 72 hours after the second notification, the document will be purged automatically. You will be notified.

24 Hour Customer Service - 800 233-4545 Toll Free

2486929915

SENDER-BASED FACSIMILE STORE AND FORWARD FACILITY

BACKGROUND OF THE INVENTION

The present invention relates generally to the field of facsimile telecommunications, and more specifically, to the field of facsimile store and forward facilities.

The transfer of information using facsimile technology has become a very widespread and important mode of communication. A very large number of facsimile machines are currently in use as essential components of many businesses. Unfortunately, while facsimile technology has existed for many years now, the conventional method of facsimile communication has several rather serious drawbacks. While conventional facsimile communication can often be faster, less expensive, and more convenient than other forms of information transfer, such as the postal service or courier document delivery services, facsimile communication is currently plagued by many new and old problems which may delay or prevent the transfer of information.

Many problems related to conventional facsimile communication are well known. It is very common for destination numbers to be busy or unavailable due to heavy usage, time zone incompatibilities, etc., often forcing the sender of facsimile information to inconveniently attempt to complete the call later. Thus, destination availability is an area of risk for conventional facsimile communication. Another area of risk surrounds the phase of actually electronically transferring information to the correct destination facsimile machine to generate a hard copy. For instance, it is not uncommon for senders of facsimile information to make mistakes in dialing destination facsimile telephone numbers, for switching equipment in public and private networks to fail or misdirect a call, or even for facsimile information to be overwritten in facsimile machines with limited amounts of storage memory. Thus, in addition to destination availability, the electronic transfer phase is another area of risk for conventional facsimile communication.

Other problems of conventional facsimile communication relate to the physical phase of transferring a facsimile hard copy output from a destination facsimile machine to the intended recipient. This area of risk for conventional facsimile communication arises from the inherent separation between people and facsimile machines. Put simply, while most facsimile machines are stationary, people are not. For a variety of reasons, including the current state of facsimile technology, most people do not continuously carry portable facsimile machines wherever they go. Consequently, the actual transfer of facsimile information between people, rather than simply between facsimile machines, is still at risk to a variety of circumstances delaying, or even preventing, the transfer. Unless the intended recipient happens to be standing at the receiving facsimile machine when a hard copy is generated, the next best scenario is that the hard copy is immediately noticed by someone else who personally takes the hard copy to the intended recipient. Unfortunately, it is much more common that (i) the hard copy is ignored for a long period of time in a facsimile tray, in an employee mail slot, on an intermediate employee's desk, or in a variety of other places, (ii) the hard copy is mistakenly directed to, or obtained by, an employee other than the intended recipient, or (iii) the hard copy is mistakenly thrown away. These are only a few of the reasons the physical phase of transferring a facsimile hard copy to an intended recipient is an area of risk for conventional facsimile communication.

Despite the many problems related to facsimile communication, senders often incorrectly assume that successful facsimile communication has taken place. Senders often mistakenly rely on so-called "confirmation" printouts from the sending facsimile machines even though such indications do not confirm communication with the intended recipient person but merely suggest that information has been transferred to some machine somewhere. Moreover, many of the previously-identified problems are intensified and create additional frustration when information to be communicated is especially important, urgent, or confidential.

Others in the past have offered systems and methods for addressing these and the above concerns, all of which have thus far failed to obtain widespread adoption by the majority of facsimile users. One proposed solution involves facsimile store and forward facilities (F-SAFF's) which provide various facsimile mailbox services to authorized subscribing users or owners of such systems. In addition to often being unavailable to members of the general public without prior, known established relationships with senders or intended recipients, most previous systems fail to provide senders with significant control, confirmation, or monitoring options. A sender is unable to discourage undesirable viewing of confidential information by those other than the intended recipient or confirm or monitor communication of urgent or important information with the actual intended recipient. Consequently, it is very common for senders and intended recipients to engage in very unproductive and time consuming processes of personally attempting to verify successful facsimile communication.

There is, therefore, a need in the industry for a system which addresses these and other related, and unrelated, problems.

SUMMARY OF THE INVENTION

Briefly described, the present invention includes a sender-based facsimile store and forward facility (F-SAFF) which, in its most preferred method and apparatus embodiments, enhances facsimile communication through a public switched telephone network (PSTN) between a sender at a transmitting facsimile machine and an intended recipient at a receiving facsimile machine. Store and forward services are provided which help ensure confidential, timely delivery of facsimile information. Sender facsimile data is directed to the F-SAFF which, for each transmission, analyzes the sender facsimile bitmapped image data to recognize a notification facsimile telephone number and a confirmation facsimile telephone number, transmits generated notification facsimile data to a facsimile machine at the notification facsimile telephone number to produce a notification report providing notification of pending, available confidential facsimile data, transmits sender facsimile data to a receiving facsimile machine during a telephone call from the intended recipient at the receiving facsimile machine upon receiving a valid confidential retrieval code from the intended recipient, and subsequently transmits generated confirmation facsimile data to a facsimile machine at the confirmation facsimile telephone number to produce a delivery confirmation report suggesting delivery not only to a facsimile machine, but to the intended recipient.

To utilize the sender-based F-SAFF of the preferred embodiment of the present invention, a sender initiates a facsimile transmission to the F-SAFF. If the sender is utilizing a conventional facsimile machine, the sender first obtains and completes a pre-printed, specialized waybill form for use as a cover sheet for the facsimile transmission. The sender completes the waybill form by providing various types of information through marking on the waybill form in defined mark image areas by hand or with the help of a typewriter or other printing device. The various types of information include, among many others, the sender's name, the sender's voice telephone number, the intended recipient's name, a notification facsimile telephone number (such as the intended recipient's facsimile telephone number), a confirmation facsimile telephone number (such as the sender's facsimile telephone number), an indication of a desired billing method, a billing account number, a sender signature, an optional sender-generated retrieval code, and an optional notification comment. Most mark image areas on the waybill form are character image areas bordered by character boxes and grouped according to information type. For the billing method indication, the waybill form includes selection box image areas inside which the sender is to mark a check or other mark indicating selection, and for the sender signature and the optional notification comment, the waybill form includes free form image areas defining large blocks of space within which the sender is able is to provide free form markings.

According to the preferred embodiment of the present invention, the F-SAFF also accepts sender facsimile data from other sources in addition to conventional facsimile machines, such as facsimile-equipped computers, personal digital assistants, and other data computers operating in both facsimile and non-facsimile communication formats. Thus, in operating certain of these devices a sender is able to simply respond to device prompts and pre-define various options so that the device automatically generates sender data for a routing page equivalent to the data representing the waybill form routing page used with conventional facsimile machines. Also, the scope of the present invention includes receiving sender facsimile data from network facsimile servers and from conventional facsimile machines connected to the F-SAFF by specialized facsimile interfaces. Furthermore, the present invention includes, according to alternate configurations, detecting at least a portion of the information ordinarily provided on the waybill form by interpreting DTMF digits or voice signals provided by the sender over an ordinary telephone.

Upon receiving a call from any sender in the general public, the F-SAFF creates a job profile record which, unlike a mailbox system, is created without regard to any prior relationships between the F-SAFF and the sender or the F-SAFF and the intended recipient. Furthermore, the job profile record is created without any initial link to the identity of the intended recipient. The F-SAFF then executes a receive routine (based on a recognition of the number dialed by the sender) to receive the sender facsimile data through the PSTN. A store routine is then executed to convert the data into a storage format and store the data in a mass storage subsystem. Then, according to the preferred embodiment of the present invention, the F-SAFF gives the sender the option of leaving a voice message which is also converted and stored in the mass storage subsystem. In other embodiments, this option is omitted.

The F-SAFF then begins an analysis routine by first analyzing the sender facsimile data to identify the sender-completed waybill form portion of the sender facsimile data. A unique waybill number is pre-assigned to each waybill form and is represented on the waybill form in both bar code and conventional numeric formats. The waybill page is identified by locating the bar code representation of the waybill number and identifying the waybill number. The sender facsimile data representing the waybill page is then analyzed to segment the data into data representing standardized form areas and data representing mark image areas on the waybill page where the sender is to provide markings. The data representing mark image areas includes selection box data representing selection box image areas, free form data representing the free form image areas, and character image data representing individual character image areas. The address of the stored free form data, if non-blank, is saved in the job profile record.

A character recognition process then converts the bitmapped image data for each character image into an ASCII (American Standard Code for Information Interchange) character. The character recognition methods include first attempting to recognize each character through electronic optical character recognition means. Then, for character image data representative of character image areas for which the intelligent electronic means fails to attain a minimum likelihood of accuracy, bitmapped image data is displayed on a display screen to one or more human operators who audibly identify the characters to voice recognition devices controlled by the F-SAFF. Also, if a human operator is unable to identify one or more necessary characters, or if necessary image fields are blank, the human operator will attempt to call the sender at the sender voice telephone number to obtain the necessary information. Since the job profile record includes character fields for each type of character information on the waybill form, such as the sender's name, a plurality of ASCII characters are saved in each character field. The selection box data is analyzed to determine the desired billing method. In addition to the results of the analysis being saved in the job profile record, depending on the selected billing method, the billing information is validated. If the confidential retrieval code field contains blanks, indicating that the sender did not enter a sender-generated retrieval code, the F-SAFF generates a retrieval code and stores that code in the job profile record.

Subsequently, dependent on successful completion of the recognition process, a notification routine is initiated to generate and transmit notification facsimile data to notify the intended recipient that facsimile data is stored and available for retrieval by the intended recipient. The F-SAFF creates a notification image file by merging a standardized template image file with selected data from the job profile record. The standardized template image file includes the basic outline and structure of the notification image file along with instructions for retrieving the stored facsimile information, including a telephone number to call. The selected data from the job profile record includes, among other information, the intended recipient's name, the sender's name, the confidential retrieval code if generated by the F-SAFF (the word "PRIVATE" is included in the notification image file if the sender marked a sender-generated retrieval code on the waybill form), the free-form comment field, and the name and voice telephone number of an operator available to provide assistance if all pages are not complete when later delivered. After being generated, the notification image file is transmitted to a facsimile machine at the notification facsimile telephone number to produce a notification report. Subsequently, and at timed intervals, the notification transmission is repeated until the sender facsimile data is delivered or until the expiration of a maximum amount of time. Since the F-SAFF is designed to be continuously available, the conventional area of risk surrounding destination availability is reduced by the present invention. Additionally, by providing a unique notification method, the specialized notification report increases the likelihood that important, urgent, or confidential information will be delivered in a timely manner.

A deliver routine is initiated when an intended recipient, or authorized agent thereof, responds to the notification report and, from any location with a facsimile machine coupled to the telephone line, calls the F-SAFF at the number printed on the notification report. Upon receiving the call and beginning the deliver routine (based upon a recognition of the number dialed by the intended recipient), the F-SAFF plays an audio prompt asking the intended recipient to enter the confidential retrieval code. After receiving the correct code, the F-SAFF, dependent on the selected billing method, prompts for, and verifies, a recipient billing account number. Then, the F-SAFF plays any accompanying sender voice message and subsequently prompts the recipient to prepare to receive the sender facsimile data. The sender facsimile data (other than the data representing the waybill form image) is then transferred to the intended recipient, and the job profile record is updated. Thus, since the sender facsimile information is not transferred until the intended recipient, or authorized agent thereof, indicates readiness to accept the information, the present invention reduces conventional risks in the areas associated with the electronic transfer phase and the physical phase of transferring a facsimile hard copy to an intended recipient.

Subsequently, a delivery confirmation routine is initiated. The delivery confirmation routine generates and transmits confirmation facsimile data to a facsimile machine at the confirmation facsimile telephone number to produce a confirmation report. In a manner similar to the notification routine, the delivery confirmation routine creates a confirmation image file by merging a standardized template image file with selected data from the job profile record. After transmission, the F-SAFF closes the job profile record, deletes the stored sender facsimile image data, and presents the information for account processing. Thus, unlike the conventional confirmation report which indicates successful transmission to a facsimile machine, receipt of the confirmation report of the present invention better ensures that the intended recipient received the sender facsimile information since the information would not be transferred absent action by the intended recipient or agent thereof.

In the preferred embodiment of the present invention, the F-SAFF also provides a monitoring service whereby delivery status information is made available to the sender. Upon receiving a call and beginning a deliver routine (based upon a recognition of the number dialed by the sender), the F-SAFF plays an audio prompt asking the sender to enter the waybill number. After receiving the waybill number from the sender, the F-SAFF determines the status of the job by referring to the job profile record associated with that waybill number. If the sender facsimile information has already been delivered, the sender is so advised. If the sender facsimile information has not been delivered because of a termination of the process, the sender is advised of the reason for termination. If the F-SAFF is still waiting to deliver the sender facsimile information, the sender is given the option of canceling delivery of the information or having another notification report transmitted.

It is therefore an object of the present invention to provide an improved facsimile store and forward facility which helps ensure confidential, timely delivery of facsimile information.

Another object of the present invention is to provide a sender-based facsimile store and forward facility.

Yet another object of the present invention is to provide a facsimile store and forward facility which operates without the need for prior relationships with a sender or an intended recipient.

Still another object of the present invention is to provide a facsimile store and forward facility which stores sender facsimile information in a manner unassociated with intended recipients.

Still another object of the present invention is to provide a facsimile store and forward facility which reduces the risks associated with all stages of facsimile transmission.

Still another object of the present invention is to provide a facsimile store and forward facility which provides heightened notification of pending stored facsimile information.

Still another object of the present invention is to provide a facsimile store and forward facility which transmits a notification report to an intended recipient after receiving sender facsimile information and delivers the sender facsimile information only after being called and supplied a confidential retrieval code.

Still another object of the present invention is to provide a facsimile store and forward facility which generates and transmits a notification report displaying a confidential retrieval code.

Still another object of the present invention is to provide a facsimile store and forward facility which, for each job, uses a confidential retrieval code supplied by the sender or randomly generated by the facility.

Still another object of the present invention is to provide a facsimile store and forward facility which recognizes characters from character images marked on a routing page by a sender.

Still another object of the present invention is to provide a facsimile store and forward facility which recognizes characters from character images marked on a routing page through electronic optical character recognition methods and human operator voice recognition.

Still another object of the present invention is to provide a facsimile store and forward facility which generates and transmits a delivery confirmation report suggesting delivery of sender facsimile information not only to a machine but also to the intended recipient.

Still another object of the present invention is to provide a facsimile store and forward facility which provides a monitoring service to a sender allowing the sender to cancel the job or have another notification report transmitted.

Other objects, features and advantages of the present invention will become apparent upon reading and understanding the present specification, when taken in conjunction with the accompanying drawings.

BRIEF DESCRIPTION OF THE DRAWINGS

FIG. 4 is a front pictorial view of a waybill form for use with one configuration of the F-SAFF of FIG. 1 shown with sample sender markings.

FIG. 6 is a front pictorial view of a delivery report generated and transmitted by the F-SAFF of FIG. 1 in accordance with the configuration and sample markings of FIG. 4.

DETAILED DESCRIPTION OF THE PREFERRED EMBODIMENT

Figure 1:
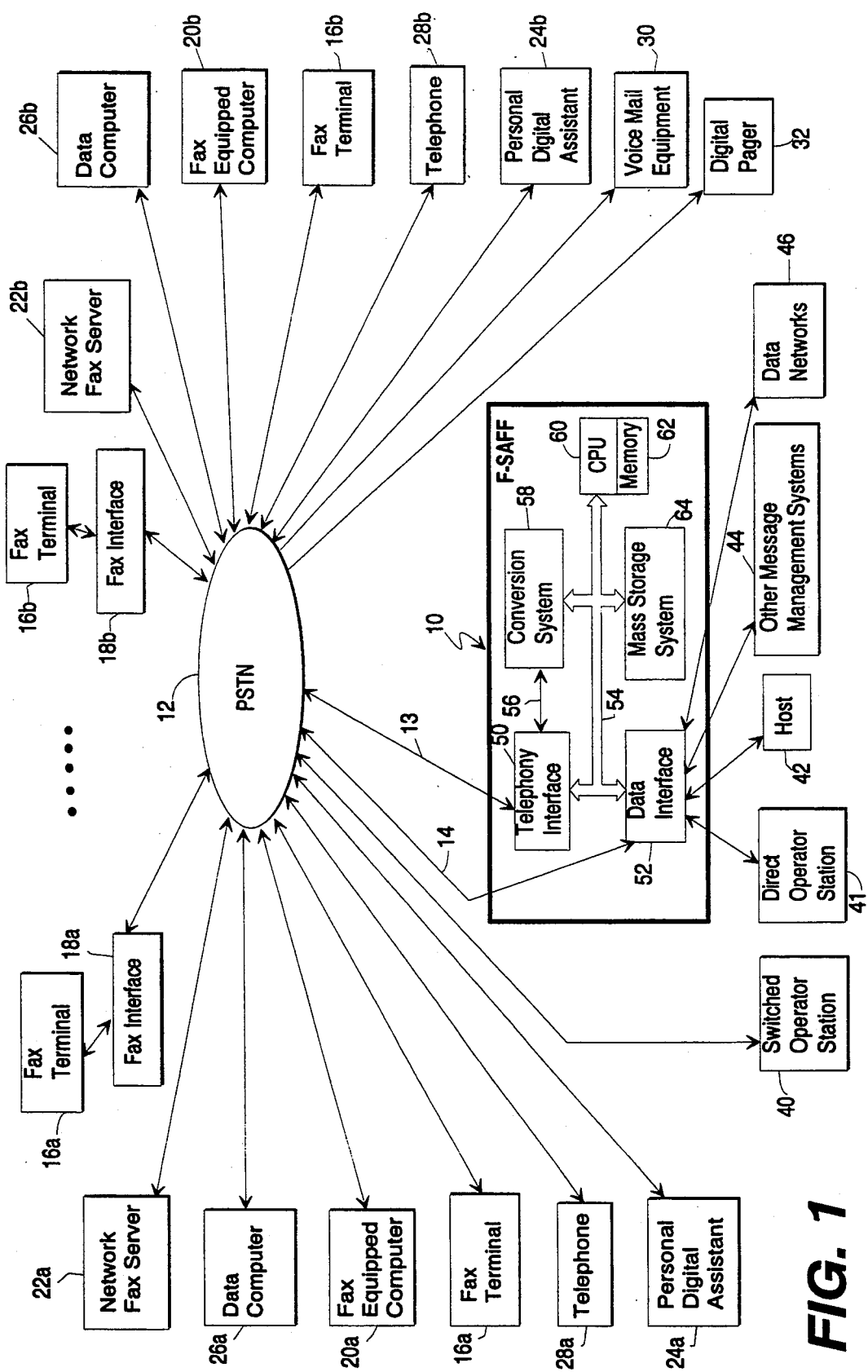
FIG. 1 is a block diagram representation of a sender-based facsimile store and forward facility (F-SAFF) with associated systems in accordance with the preferred embodiment of the present invention.

Referring now in greater detail to the drawings in which like numerals represent like components throughout the several views, FIG. 1 shows, among associated systems and in accordance with the preferred embodiment of the present invention, a facsimile store and forward facility (F-SAFF) 10 connected through a telephony interface trunk 13 and a data interface trunk 14 to a public switched telephone network (PSTN) 12 to which is connected a variety of other devices. The PSTN 12 is a common designation considered to be generally understood by those skilled in the telecommunications industry as including any number of local exchange carrier central offices, access tandems, long distance toll offices, and other telecommunication switching systems. In addition, the scope of the present invention is considered to include one or more private branch exchanges (PBX's) interposed between the PSTN 12 and the other devices connected thereto. Also, although the letter "a" is associated below with devices used by senders, and the letter "b", with intended recipients, it should be understood that such designations encompass similar types of devices and are so delineated for illustration purposes only. Thus, singular and plural references herein below in which the letters "a" and "b" are omitted should be understood to refer both sender and receiver devices generally. Furthermore, the dots indicate that the present invention is accessible by the large plurality of devices connected to the PSTN 12.

Conventional facsimile terminals 16, inclusive of most, if not all, facsimile devices ranging from older ordinary facsimile machines to newer facsimile machines with memory and other advanced features, are shown connected to the PSTN 12 through two different routes, both directly and through a facsimile interface 18. The facsimile interface 18 represents a plurality of interface devices, including routing devices which access the PSTN 12 to automatically direct calls from the facsimile terminal 16 to the F-SAFF 10 and transducer devices which generate audible indications, such as a buzzer, and/or visual indications of notification, such as a blinking light. Such transducer facsimile interfaces 18 emit tones which, when recognized by the F-SAFF 10, prompt the F-SAFF 10 to command the generation of audio/visual indications to elevate awareness of notification.

Facsimile equipped computers 20 are also shown connected to the PSTN 12. Such devices are considered well known as including all sorts of stationary and portable computer devices which include adapters providing facsimile communication capabilities. A network facsimile server 22 is also shown connected to the PSTN 12 and represents one server device in a network (local or wide area) providing facsimile communication services to user terminals in the network. The scope of the present invention should be understood to include networked environments where user workstations are only required to provide limited amounts of user information to the network facsimile server 22 which communicates with the F-SAFF 10 after merging the user information with standard information required for transmission to the F-SAFF 10. Personal digital assistants 24, commonly referred to as a PDA's, are conventional devices which include small, portable, pen-based devices having processing and facsimile communication capabilities. Some PDA's also include keyboards and/or provide radio facsimile and modem communication capabilities. Also connected to PSTN 12 are data computers 26 which represent computers with non-facsimile communication capabilities, such as conventional personal computers with conventional modems. Such computer communicate with the F-SAFF 10 through conventional data transmission formats, such as for E-mail, etc., using understood instructions and commands to relay sender information to the F-SAFF 10 for facsimile communication to an intended recipient. Telephones 28 are also shown connected to the PSTN 12 to communicate with the F-SAFF 10, as is discussed in more detail below.

While the preferred embodiment of the present invention includes potential utilization of all preceding devices connected to the PSTN 12 by both sender and intended recipient alike (thus, the "a" and "b" delineations), voice mail equipment 30 and digital pager 32 are, in the preferred embodiment of the present invention, representative of additional optional notification devices for notifying intended recipients of available stored facsimile information. The voice mail equipment 30 is representative of any messaging device including ordinary answering machines, wherein a standard message generated by the F-SAFF 10 or a message incorporating text-to-speech portions from sender facsimile information is supplied to achieve notification.

Whereas the telephone interface trunk 13 relays communication between the F-SAFF 10 and the PSTN 12 for communication with the devices 16-32, the data interface trunk 14 handles communication between the F-SAFF 10 and the PSTN 12 for communication with the switched operator station 40. The direct operator station 41 is shown connected directly to the F-SAFF 10 without travelling through the PSTN 12, suggesting co-location with the F-SAFF 10 or connection through a data network or other equivalent network. Both operator stations 40, 41 include devices for communicating with the F-SAFF 10, devices for displaying bitmapped images for identification, and devices for receiving human operator input identifying the bitmapped images. In the preferred embodiment of the present invention, the devices for receiving human operator input include mechanisms for converting human voice input into usable electronic information. A host 42, other message management systems 44, and data networks 46 are also shown connected to the F-SAFF 10 without connection through the PSTN 12. However, it should be understood that connection through the PSTN 12 for those elements is within the scope of the present invention. The host 42 represents an optional resource to which the F-SAFF 10 provides billing or customer record information for further processing. The message management systems 44 represent other F-SAFF's 10 or conventional facsimile mailbox systems, many of which adhere to an X.400 communication standard for the exchange of packetized information. The data networks 46 are representative of various other networks, such as an X.25 network, through which back-end communication may be desirable, such as a specialized facsimile machine connected directly to, and addressable on, an X.25 network.

The F-SAFF 10 is shown including a telephony interface 50 connected to a data interface 52 through an I/O (input/output) bus 54. The telephony interface trunk 13 is also shown connected to the telephony interface 50, and the data interface trunk 14 is connected to the data interface 52. The telephony interface 50 is also connected through an analog bus 56 directly to a conversion system 58 which is also connected to the I/O bus 54. A CPU (central processing unit) 60, memory 62, and a mass storage system 64 are also shown connected to the I/O bus 54. The F-SAFF 10 is shown in more detail in FIG. 2 which reveals that the conversion system 58 includes, connected through the analog bus 56, a plurality of FAX/Voice/Data subsystems 66a–f, a voice recognition subsystem 68, and an OCR (optical character recognition) subsystem 72. The mass storage system 64 is also shown including a mass media controller 74 connected to a primary storage media 76, a secondary storage media 78, and a removable media 80.

The telephony interface 50 provides signal transformation between the telephony interface trunk 13 and the analog bus 56. According to the preferred embodiment of the present invention, one acceptable example of the telephony interface trunk 13 is the standard T-1 digital communication link providing multiplexed, encoded carrier service. One example of an acceptable telephony interface 50 is the DT 100/124 from Dialogic of Parisippany, N.J. The FAX/Voice/Data subsystems 66 are discussed in more detail below with reference to FIG. 3. The voice recognition subsystem 68 provides recognition of human voice input to produce data output corresponding to predefined words or phrases. One example an acceptable voice recognition subsystem 68 is the VR/10 from Dialogic of Parisippany, N.J. The OCR subsystem 72 converts bitmapped image data into ASCII (American Standard Code for Information Interchange) characters. One example of an acceptable OCR subsystem 72 is and OCR processing card in the model M/series from Calera Recognition Systems, Inc. of Sunnyvale, Calif. The data interface 52 provides the signal conditioning and format conversions necessary for communication with a variety of switched and direct networks, acceptable examples of which include an SMC-ENET ethernet network card from Standard Microsystems Corporation of Hauppauge, N.Y., a 1400FXSA modem from Practical Peripherals, Inc. of Thousand Oaks, Calif., and an Eiconcard X.25 modem from Eicon Technology Corporation of Montreal, Quebec, Canada. The mass media controller 74 controls the operation of the primary storage media 76, secondary storage media 78, and removable media 80. The secondary storage media 78 functions as a redundant backup of all information stored on the primary storage media 76, and the removable media 80 provides additional backup and uploading capabilities. The following are examples of acceptable mass media controllers 74, primary storage media 76, secondary storage media 78, and removable media 80, respectively: a 533800 SCSI disk controller from Adaptec of Milpitas, Calif., a ST11200N hard drive from Seagate Technologies, Inc. of Scotts Valley, Calif., a 1.3GB SCSI DAT (digital audio tape) drive from Conner Peripherals, Inc. of San Jose, Calif., and a FD-235HF floppy drive from TEAC Corporation of Saitama-Ken, Japan.

The CPU 60 and memory 62, according to methods discussed below and in conjunction with other control processes running on subsystems 66, 68, and 72, control operation of the elements of the F-SAFF 10 which are connected through the I/O bus 54 which, in the preferred embodiment of the present invention, is a passive backplane bus. One example of an acceptable CPU 60 with memory 62 is the i486/33 microprocessor with 16 megabytes of RAM (random access memory), available from Intel of Santa Clara, Calif. In addition, though not shown, the F-SAFF 10 includes a conventional keyboard, video adapter, video display, chassis, power supply, and any other necessary elements which would be understood by one skilled in the art to be necessary for operating the F-SAFF 10 with such a CPU 60 from a 120 volt AC power source. One example of acceptable operation system software is RUN&NET/UU SCSI UNIX from ESIX Systems, Inc. of Minneapolis, Minn., and one example of an acceptable database software program for implementing the methods of operation discussed below is Informix from Informix Software, Inc. of Menlo Park, Calif.

Figure 2:
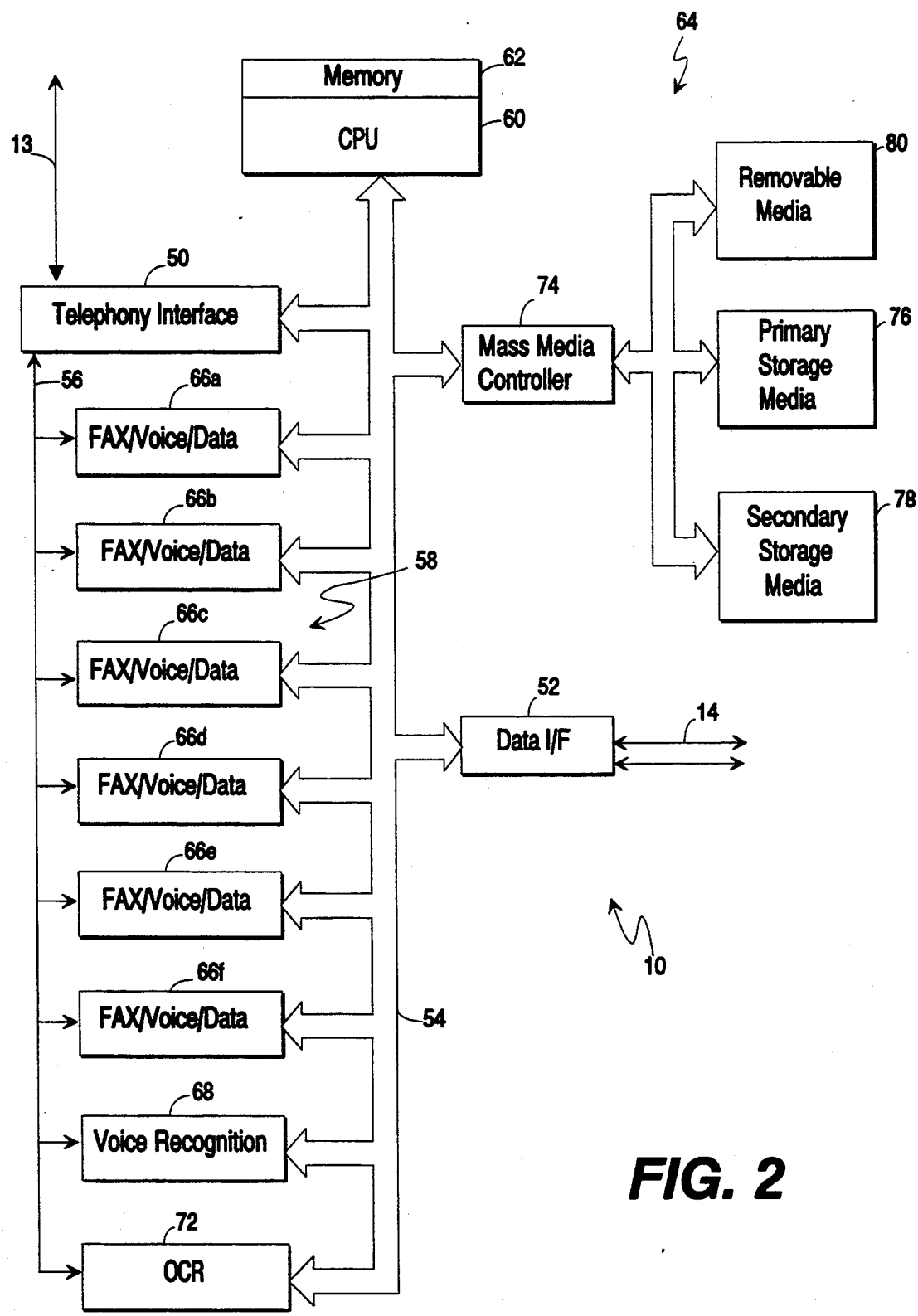
FIG. 2 is a more detailed block diagram representation of the F-SAFF of FIG. 1.
Figure 3:
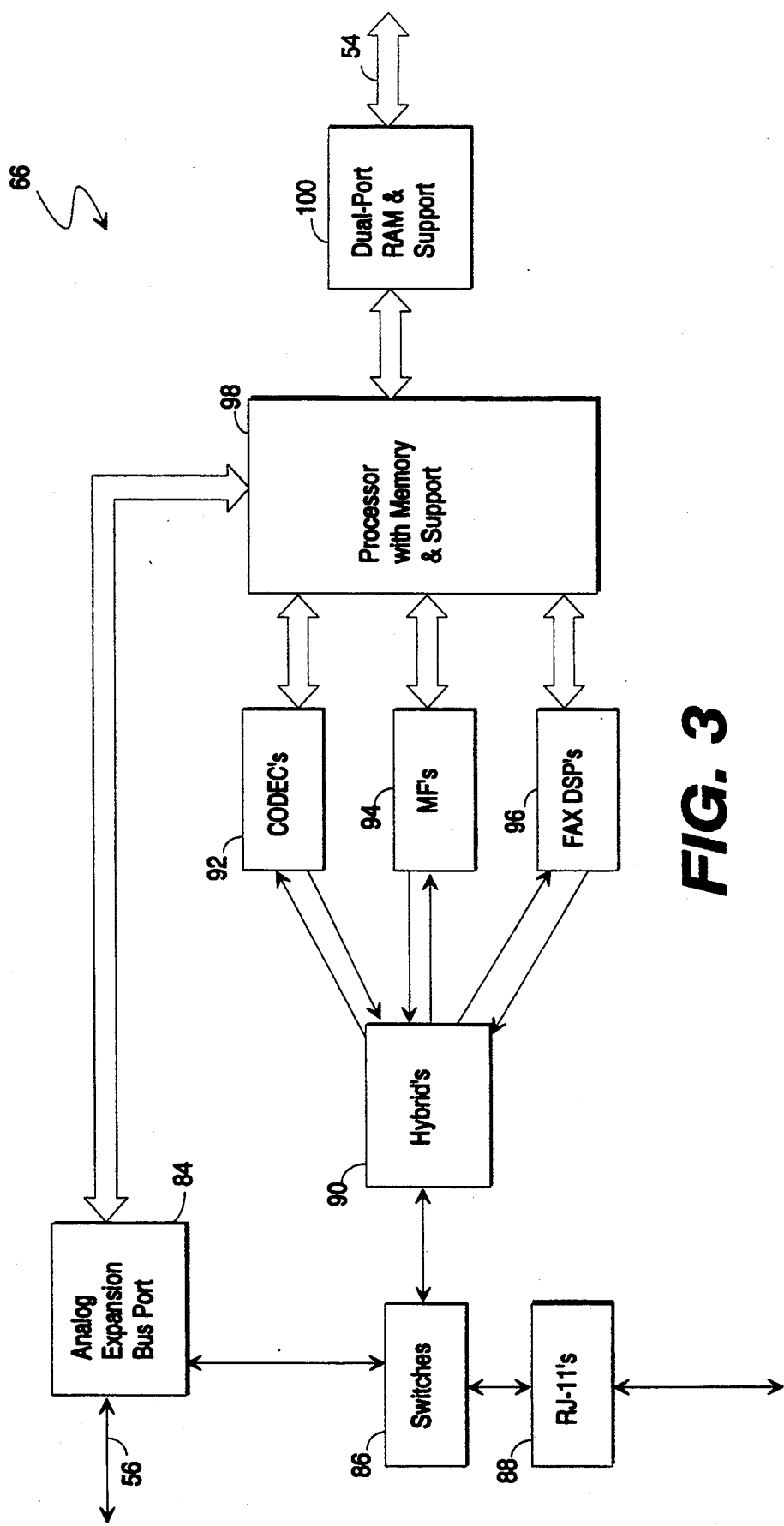
FIG. 3 is a block diagram of the FAX/Voice/Data subsystem of FIG. 2.

FIG. 3 shows a more detailed view of the FAX/Voice/Data subsystem 66 of FIG. 2. According to the preferred embodiment of the present invention, the FAX/Voice/Data subsystem 66 handles multiple facsimile and voice lines, thus accounting for the plural form of many element designations in FIG. 3. The analog bus 56 is shown connected to an analog expansion bus port 84 which is connected to a processor with memory and support 98 and to switches 86. The switches 86 selectively, based upon usage, connect the analog expansion bus port 84 and RJ-11 couplings 88 (for optional connection to ordinary telephone lines) to hybrid circuits 90 which convert between four-wire and two-wire circuits for each facsimile/voice line. The hybrids 90 are connected to the processor with memory & support 98 through CODEC's (CODer-DECoder) 92 for converting voice signals between analog and digital formats, MF's (multi-frequency decoders) 94 for receiving ANI (automatic number identification—the number from which the caller called) and DNIS (dialed number identification service—the number dialed by the caller) information via Feature Group D, etc., and FAX DSP's (facsimile digital signal processors) 96 for facsimile modulation and demodulation and DTMF (dual tone multi-frequency) detection and generation. A dual-port RAM and support resource 100 is shown connected between the I/O bus 54 and the processor with memory & support 98. The FAX/Voice/Data subsystem 66 is capable of, in response to commands received through the I/O bus 54, performing the following functions: pickup phone line, hang-up phone line, dial number (while informing of encountered call progress tones), send facsimile, receive facsimile, play voice, record voice, play text-to-speech voice, get DTMF tones. One example of an acceptable FAX/Voice/Data subsystem 66 is the AudioFAX 4-port voice/fax card available from AudioFAX, Inc. of Atlanta, Ga., which supports four channels of voice and facsimile through both hardware and soft-loadable firmware.

Figure 4:
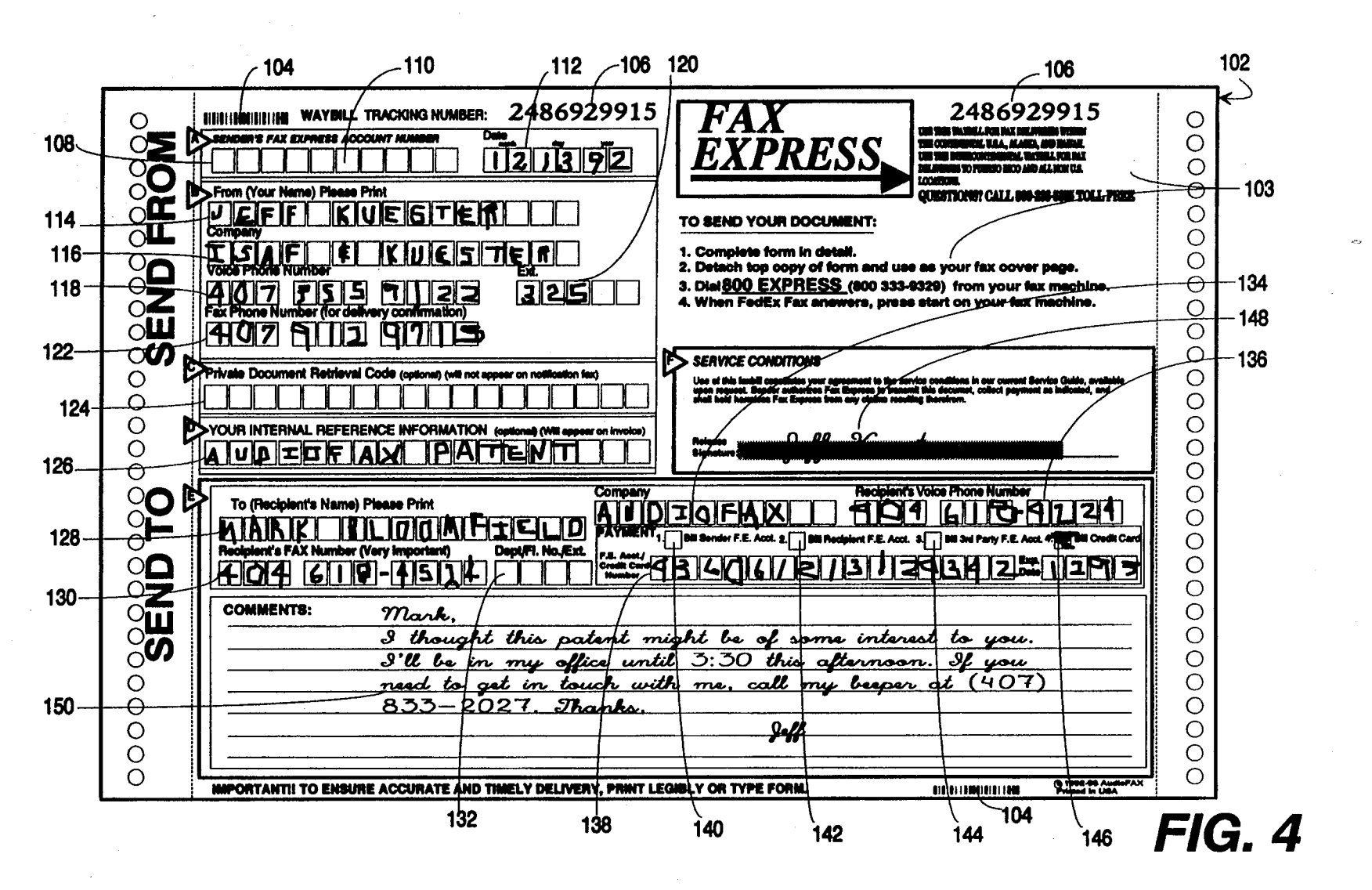

FIG. 4 shows a front pictorial view of a waybill form 102 for use with one configuration of the preferred embodiment of the present invention shown with sample sender markings. Waybill instructions 103 are shown for instructing a sender how to use one configuration of the preferred embodiment of the present invention. Bar code representations of the waybill number 104 are shown at the top left and bottom right corners of the waybill form 102, along with waybill number numeric representations 106 at the top left and right corners of the waybill form 102. An optional sender system-account-number mark area 108 is shown titled and including a plurality of character image areas bordered by character boxes 110. A date mark area 112 is shown below the waybill number numeric representation 106. Sender identification mark areas including a sender name mark area 114, a sender company mark area 116, a sender voice number mark area 118, a sender voice extension mark area 120, and a confirmation facsimile number mark area 122 are shown on the waybill form 102. An optional sender-generated CRC (confidential retrieval code) mark area 124 and an optional sender reference mark area 126 are also shown. Recipient identification information shown on the waybill form 102 includes an intended recipient name mark area 128, a notification facsimile number mark area 130, an intended recipient voice extension number mark area 132, an intended recipient company mark area 134, and an intended recipient voice number 136. Desired payment method is indicated by, depending on the desired method, marking a number and expiration date in a billing number mark area 138 and producing some sort of mark in one of the selection box mark areas designated as a bill sender system account selection box mark area 140, a bill recipient system account selection box mark area 142, a bill third party system account selection box mark area 144, and a bill credit card selection box mark area 146, shown illustratively marked in FIG. 4. Two flee-form mark areas are shown including a signature mark area 148 and a comment mark area 150.

Figure 5:
FIG. 5 is a front pictorial view of a notification report generated by the F-SAFF of FIG. 1 in accordance with the configuration and sample markings of FIG. 4.

FIG. 5 shows a front pictorial view of a notification report 160 produced according to one configuration of the preferred embodiment of the present invention in accordance with the sample markings shown on the waybill form 102 in FIG. 4. Waybill number bar code representations 104 and numeric representations 106 are shown at the top and bottom of the notification report 160. Notification instructions 161, 162 are shown for facilitating delivery to an intended recipient and for instructing an intended recipient how to retrieve stored sender facsimile information, respectively. Generated, facsimile specific types of information including the date and time of the notification, the number of pages in the sender facsimile information, and the existence of an accompanying voice message are indicated as date and time indication 164, a page total indication 166, and a voice message indication 168, respectively. A CRC indication 174 is also shown on the notification report 160. Reproduced intended recipient and sender information is also produced on the notification report 160 as an intended recipient name reproduction 180, a notification facsimile number reproduction 182, an intended recipient company reproduction 184, an intended recipient voice number reproduction 186, an intended recipient voice extension number reproduction 188, a sender name reproduction 190, a confirmation facsimile number reproduction 192, a sender company reproduction 194, a sender voice number reproduction 196, and a sender voice extension number reproduction 198. A comment reproduction 200 is also shown on the notification report 160.

FIG. 6 shows a front pictorial view of a delivery report 210 produced according to one configuration of the preferred embodiment of the present invention in accordance with the sample markings shown on the waybill form 102 in FIG. 4. Waybill number bar code representations 104 and numeric representations 106 are shown at the top and bottom of the delivery report 210. A date & time indication 214 is also shown for the date & time the delivery report 210 is produced. Delivery report instructions 212, 213 are shown for facilitating delivery of the report 210 to the sender and for providing other general information. Sender and intended recipient identification information is also reproduced as a sender name reproduction 216, a sender company reproduction 218, a sender voice number reproduction 220, a sender voice extension number reproduction 222, a confirmation number reproduction 224, an intended recipient name reproduction 226, an intended recipient company reproduction 228, an intended recipient voice number reproduction 230, an intended recipient voice extension number reproduction 232, and a notification facsimile number reproduction 234. A sender reference reproduction 236 is shown above a group of generated, facsimile specific types of information including a submission date/time indication 238, an originating facsimile number indication 240 identified through CSI (called subscriber identification) or ANI information received during receipt of sender facsimile information, a page total indication 242, one or more notification date/time indications 244, a recipient retrieval date/time indication 248, and a retrieval facsimile number indication 250 identified through CSI or ANI information received during delivery of sender facsimile information.

In addition to occasional reference to preceding FIGURES, refer now to FIGS. 7-15 which show block diagram representations of steps taken in one method of the preferred embodiment of the present invention. After the method begins in step 210, step 212 indicates that the user prepares and dials the F-SAFF 10 via the PSTN 12 (FIG. 1). If the user is a sender desiring to submit sender facsimile information to the F-SAFF 10 through a conventional facsimile terminal 16a (FIG. 1), the preparation includes completing a waybill form 102 (FIG. 4) by marking in the predefined mark areas by hand or with the help of a typewriter or other printing device. According to one method of the present invention, blank waybill forms 102 are widely distributed to the general public in a manner similar to the way in which over-night courier services supply courier waybill forms. Once the waybill form 102 is completed, the sender readies the information with the waybill form 102 positioned as a cover sheet and dials a telephone number listed on the waybill form 102 to access the F-SAFF 10. If the sender uses one of the other devices 20a–28a connected to the PSTN 12 (FIG. 1) to submit sender facsimile information to the F-SAFF 10, an alternate method of preparation is followed by the sender. Rather than physically marking information on a separate waybill form 102, the sender is able to simply respond to prompts from the devices 20a–28a to have the necessary information, including a routing page substitute for the waybill form 102, generated automatically. Thus, although only use of the waybill form 102 is discussed below, it should be understood that the scope of the present invention includes the generation of equivalent routing pages.

At step 214, the F-SAFF 10 detects the incoming call and goes off hook on the line receiving the call through the FAX/Voice/Data subsystem 66 (FIG. 2) and telephony interface 50. At step 216, the F-SAFF 10 detects DNIS and ANI information from the PSTN 12 through the MF's 94 (FIG. 3) and executes a receive, deliver, or monitor application based upon the DNIS, as indicated by decision block 218. When a sender dials a submission number printed on the waybill form 102, a receive application will begin at step 218. As is discussed in more detail below, when an intended recipient calls the F-SAFF 10 at a telephone number listed on the notification report 160 (FIG. 5) to retrieve facsimile information, the deliver application is selected at step 218 such that processing continues at step 220 according to the deliver routine, and when a sender calls the F-SAFF 10 at a monitoring telephone number to monitor the status of previously submitted facsimile information, the monitor application is selected at step 218 such that processing continues at step 222 according to the monitor routine.

Figure 8:
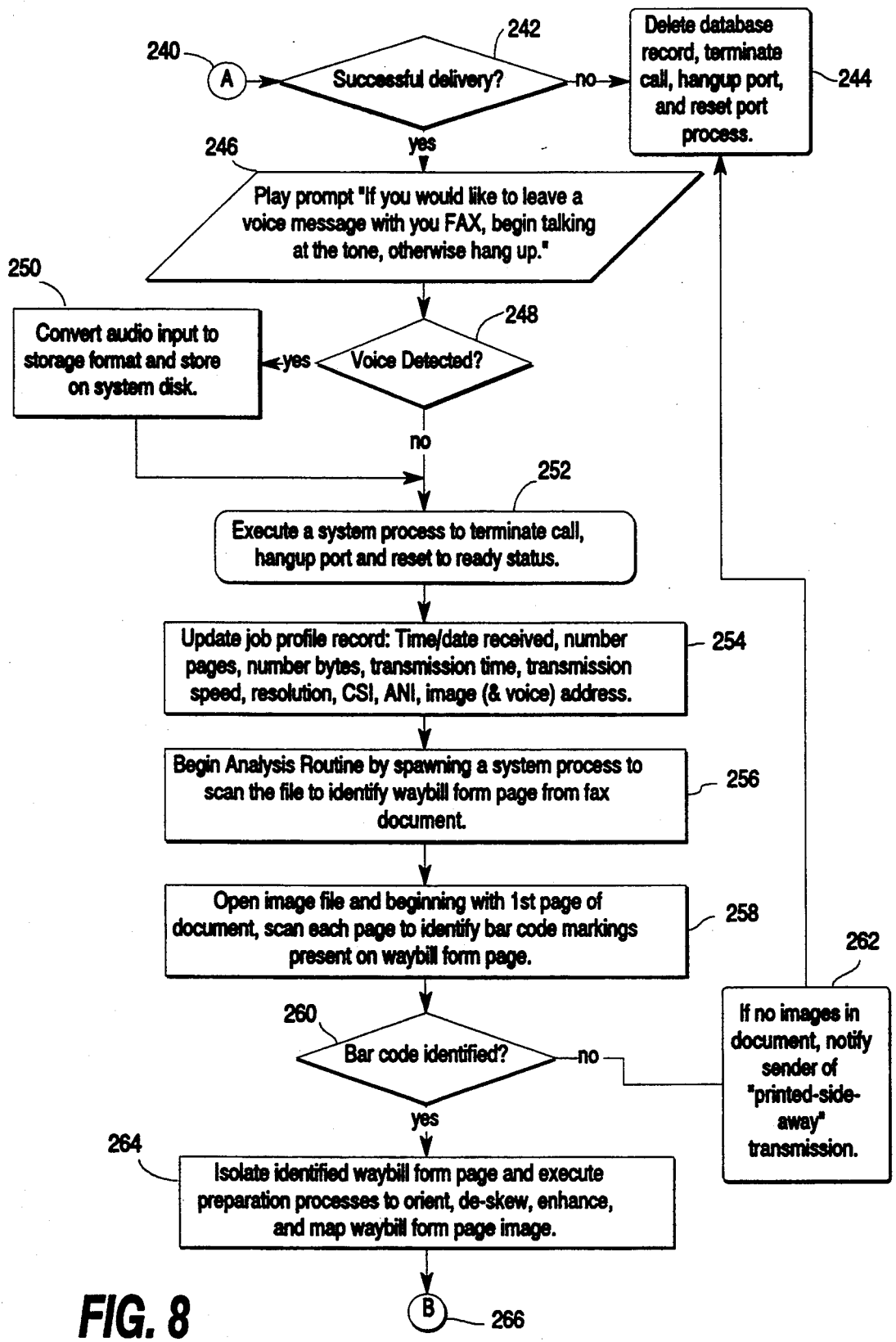
Figure 9:
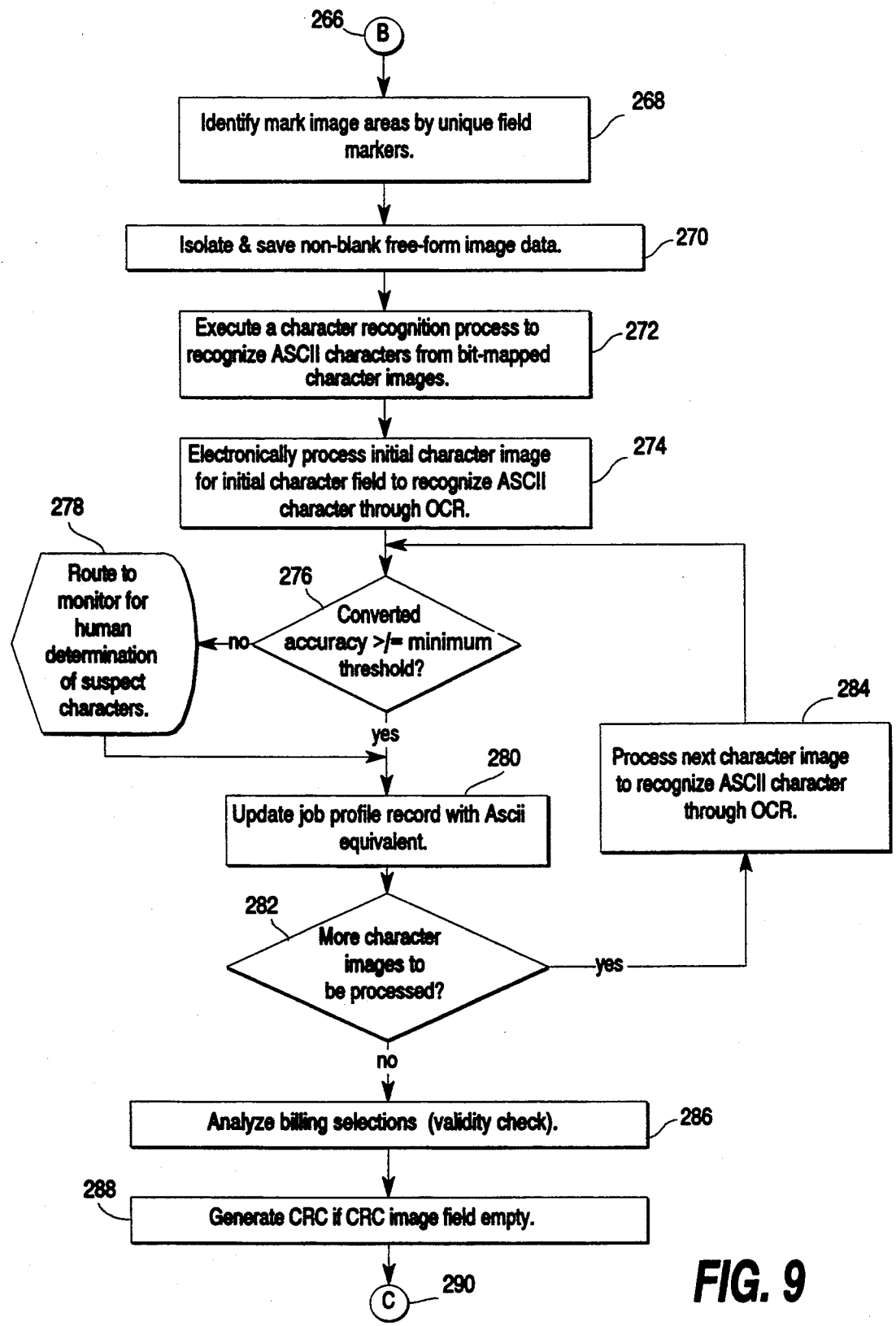

Step 224 indicates that the receive routine begins by creating a job profile database record based on the ANI (or an internally generated number if the ANI is not available or disabled) and executing a system process to retrieve an audio file from the mass storage system 64 (FIG. 1) and present that file to the FAX/Voice/Data subsystem 66 for the line receiving the call from the sender. The job profile record is, therefore, created without regard to any prior relationships between the F-SAFF 10 and the sender or the F-SAFF 10 and the intended recipient and without an initial link to the identity of the intended recipient. By reproducing the digitized voice in the audio file, the F-SAFF 10 plays on the line to the sender the prompt, "You have reached FAX Express services. Please press the start button on your fax machine now." At decision block 228, if a hang up call progress tone is detected, the call is terminated, the port is instructed to hang up, and the process is reset at step 230. According to decision block 232 and step 234, if a predetermined delay elapses for the first time, another audio file is presented to the FAX/Voice/Data subsystem 66 to play the prompt, "Please press the start button on your fax machine now." On the other hand, if such a delay elapses for more than a predetermined number of time, step 236, like step 230, terminates the process. If facsimile tones are sensed at step 228, step 238 indicates that the F-SAFF 10 begins a process to receive and store the sender facsimile information in the mass storage system 64. Referring to FIG. 8 by connector 240, if delivery of the sender facsimile information is not successful, decision block 242 directs processing to step 244 which indicates that the F-SAFF 10 deletes the job profile database record, terminates the call, hangs up the port, and resets the process. On the other hand, if delivery is successful, the sender is prompted at step 246 to leave a voice message with the facsimile information which is digitized and stored if voice is detected, according to decision block 248 and step 250. Subsequently, according to step 252, the call is terminated, etc., and, according to step 254, the job profile record is updated with system-generated information and other information received from the PSTN 12.

As indicated by steps 256 & 258, an analysis routine begins by identifying the bitmapped image representation in the sender facsimile information of the page comprising the waybill form 102. Such a page is identified by locating the bitmapped representation of the waybill number bar code representation 104 (FIG. 4.) and identifying the waybill number. If the bitmapped representation of the bar code representation 104 is not found, a process is initiated to call the sender back at the CSI number, if valid, otherwise at the ANI number, to notify the sender that the pages were transmitted dataside-away. If the waybill form page is identified by locating the bitmapped representation of the bar code representation 104, the process continues at step 264 which indicates that the bitmapped image representation of the waybill form page is isolated, oriented, deskewed, enhanced, and mapped to prepare the image for further analysis which is detailed in FIG. 9 by way of connector 266.

Further analysis includes, as indicated by step 268, identifying bitmapped image data representing the mark image areas where the sender provides marks by using as references bitmapped image representations of unique field markers in standardized form areas on the waybill form 102. The mark area bitmapped image data includes billing selection box data representing the billing selection box image areas 140–146, (FIG. 4) free form data representing the free form image areas 148 and 150, and character image data representing the character image mark areas comprising the remaining mark areas on the waybill form 102. According to step 270, the free form image data is isolated and, if non-blank, saved at addresses subsequently recorded in the job profile record. Although not shown in FIG. 9, if the signature mark area 148 contains no marks, the process is terminated with the reason for such termination being saved in the job profile record.

Subsequently, in step 272, a character recognition process is initiated to recognize ASCII characters from the bitmapped character image data. Since the job profile record includes character fields for each type of information, each character field will accommodate a plurality of ASCII characters. Step 274 indicates that an electronic optical character recognition (OCR) process is first employed to recognize an ASCII character from character image data representing each character image mark area. Decision block 276 indicates that depending on a determination of the likelihood that the OCR conversion was accurate, as well as the need for a particular character to be accurate, the character image data will be directed to a human operator for display and identification, as shown in step 278. In other words, if there is an insufficiently low likelihood that a particular character image has been correctly recognized as an ASCII character, and if the character image represents a necessary character, such as a number in the notification facsimile telephone number, the process is directed to step 278. Likewise, if a character image for a necessary character is blank, the process will be directed to step 278. In step 278, a human operator will attempt to identify the character from a display of the character image.

If the operator is unable to identify the character, having the option of viewing the entire image file as well, the operator has the ability and telephone access to call the sender to request clarification. If unable to supply necessary information, the process ends with the job profile record being appropriately noted. Regardless of whether the character is recognized through the electronic means represented by step 274 or through the human means represented by step 276, the character field in the job profile record is updated in step 280. Decision block 282 and step 284 indicate that this process continues until all character images are processed or ignored (if the character is unnecessary), or the process is terminated in step 278 by the operator.

Step 286 indicates that the billing selection box data is analyzed to determine which of the billing selection box mark areas 140-146 were marked by the sender. If the bill sender system account selection box mark area 140 was marked, any number in the character field in the job profile record representing the sender system account number mark area 108 is read and verified. Similarly, for the other billing selection box mark areas 142, 144, and 146, any number in the job profile record character field representing the billing number mark area 138 is read and verified. If such character field is empty, and one of the other billing selection box mark 142, 144, or 146 were marked, the intended recipient will be required to supply the appropriate billing account number before receiving the sender facsimile information, as is discussed below. Subsequently, according to step 288, if the character field in the job profile record representing the sender-generated CRC mark area 124 contains blanks, a CRC is generated randomly and recorded in the job profile record. In alternate configurations of the F-SAFF 10 of the present invention, the information obtained through OCR of the waybill form 102 (FIG. 4) is obtained through receiving DTMF digits from the sender and/or directing sender voice signals through the voice recognition subsystem 68 (FIG. 2).

Figure 10:
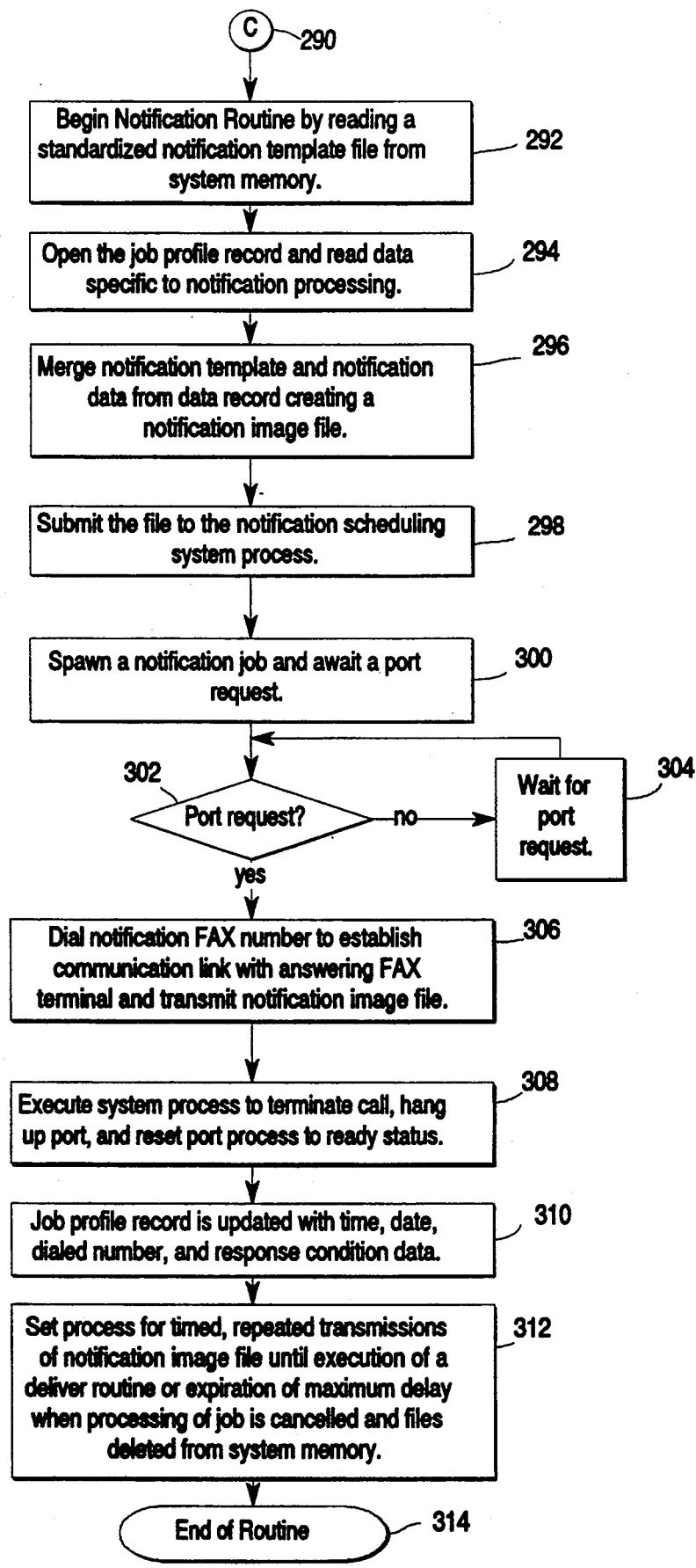

Referring now to FIG. 10, a notification routine now begins by, in step 292, reading a standard notification template file from the mass storage system 64 (FIG. 1), reading certain fields in the job profile record according to step 294, and, according to step 296, merging the standard notification template file with the selected job profile record fields to create a notification image file which, when transmitted and output from a facsimile terminal 16b according to steps 298-306, resembles the sample notification report 160 of FIG. 5. The word "PRIVATE" is substituted for the CRC indication 174 in FIG. 5 if a code is marked in the sender-generated CRC mark area 124 on the waybill form 102 (FIG. 4). Transmission of the file includes waiting for a port request from the FAX/Voice/Data subsystem 66 (FIG. 2), subsequently accessing the PSTN 12 (FIG. 1) to dial the number in the notification character field in the job profile record representative of the notification fax number mark area 130 from the waybill form 102 (FIG. 4), and transmitting the file after establishing a communication link with an answering facsimile terminal 16b (FIG. 1). If a device other than a facsimile terminal 16b answers the call, the F-SAFF 10 will detect such device and respond accordingly. In other words, if the notification fax number mark area 130 is marked with a number for a digital pager 32, voice mail equipment 30, ordinary telephone 28b, data computer 26b, or other notification device, the F-SAFF 10 will provide a notification message in the appropriate format, such as a standardized, and/or waybill form text-to-speech, audio messages for the voice mail equipment 30 or a delivery access number for the digital pager 32. In other configurations, additional separate character mark areas and selection box mark areas are provided on the waybill form 102 for selectively accessing other devices without requiring the F-SAFF 10 to determine the device type after initiating the telephone call. After one transmission of the notification image file is complete, the call is terminated, etc. at step 306, and the job profile record is updated with the information indicated in step 310. Subsequently, and at timed intervals, the notification transmission is repeated until the sender facsimile data is delivered, as discussed below, or until the expiration of a maximum amount of time.

Figure 7:
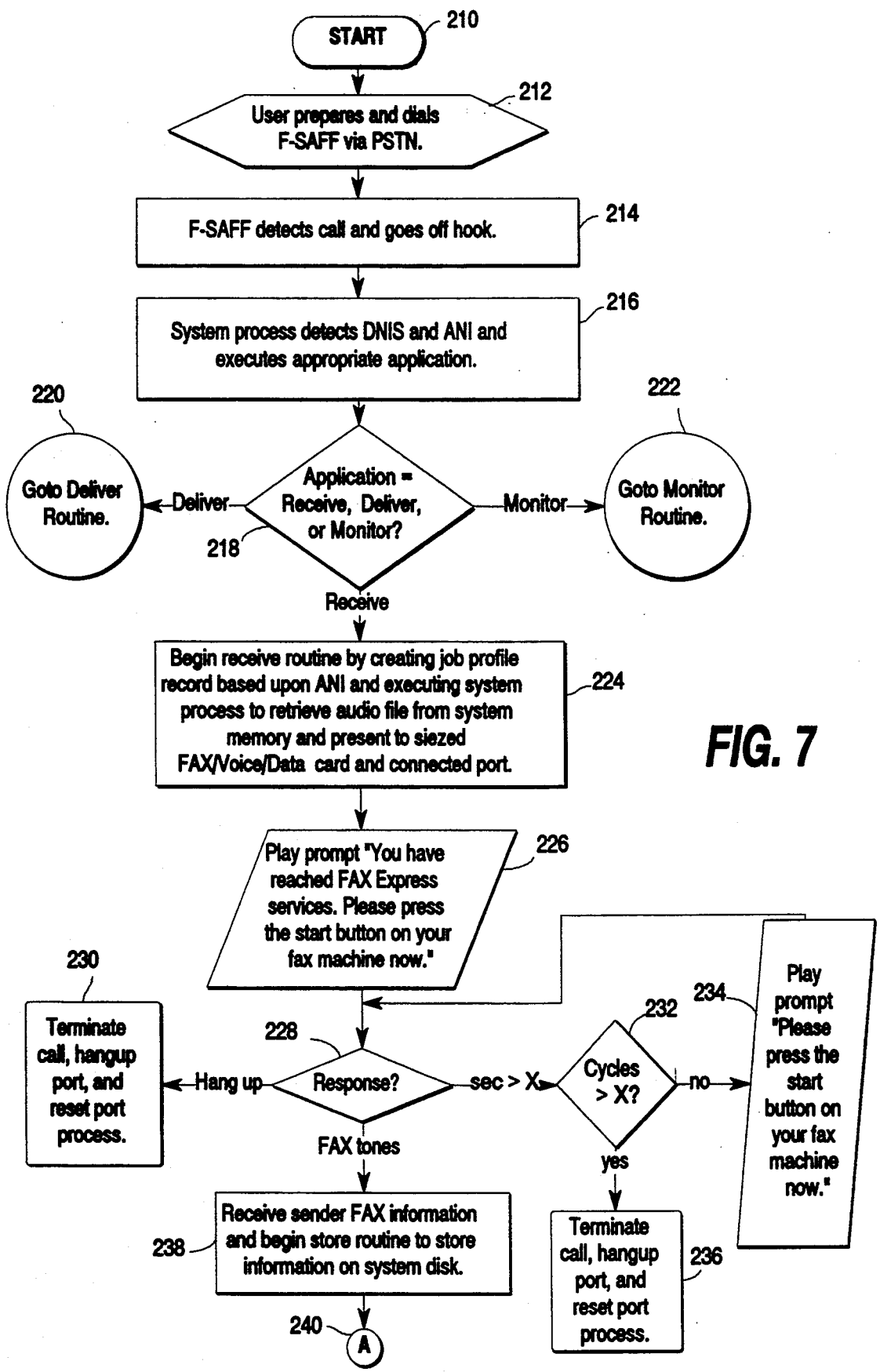
FIGS. 7-15 are flow chart representations of the steps of one method of the preferred embodiment of the present invention.
Figure 11:
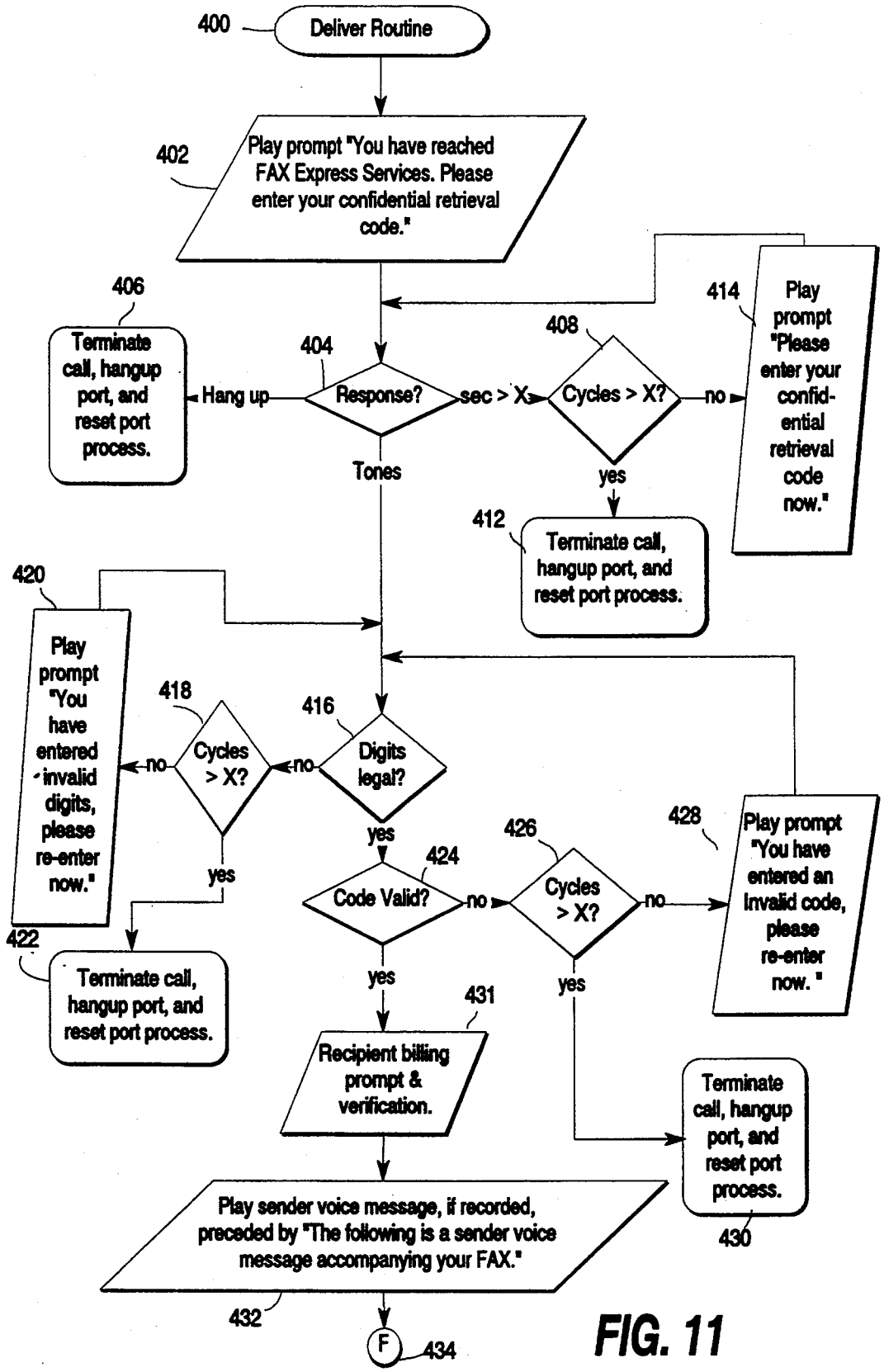

Referring back to step of 212 of FIG. 7, after a notification report 160 (FIG. 5) is received by an intended recipient, or authorized agent thereof, the intended recipient (the new "user") prepares by discovering the retrieval telephone number printed on the notification report 160 (FIG. 5) and calls the F-SAFF 10 (FIG. 1) through the PSTN 12 from any location with a coupled facsimile machine 16b (or equivalent). Subsequently, according to steps 214, 216, 218, and 220, the F-SAFF 10 initiates a deliver routine based upon the DNIS information. Referring now to FIG. 11, the deliver routine begins by prompting the user for the CRC. If the user is ultimately unable to provide the CRC through pressing keys on the telephone 28b (FIG. 1), the process is terminated, port reset, etc., as indicated in steps 404-430. On the other hand, upon successful validation of a CRC, the corresponding job profile record is accessed, and if some form of recipient billing was selected, the recipient is prompted for a billing account number which is verified before processing is continued, according to step 431. Subsequently, step 432 indicates that any accompanying stored voice message is played to the user.

Figure 12:
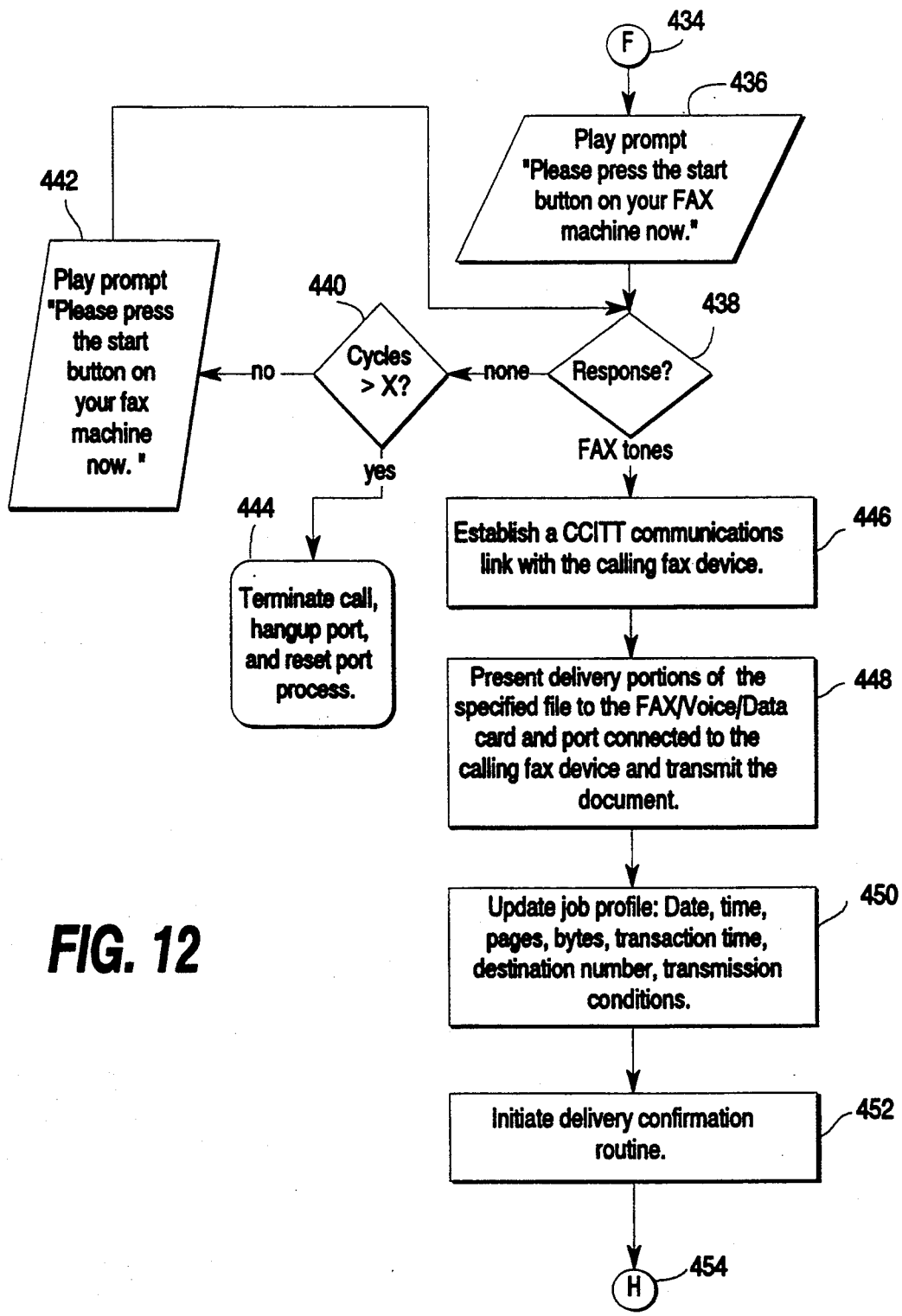
Figure 13:
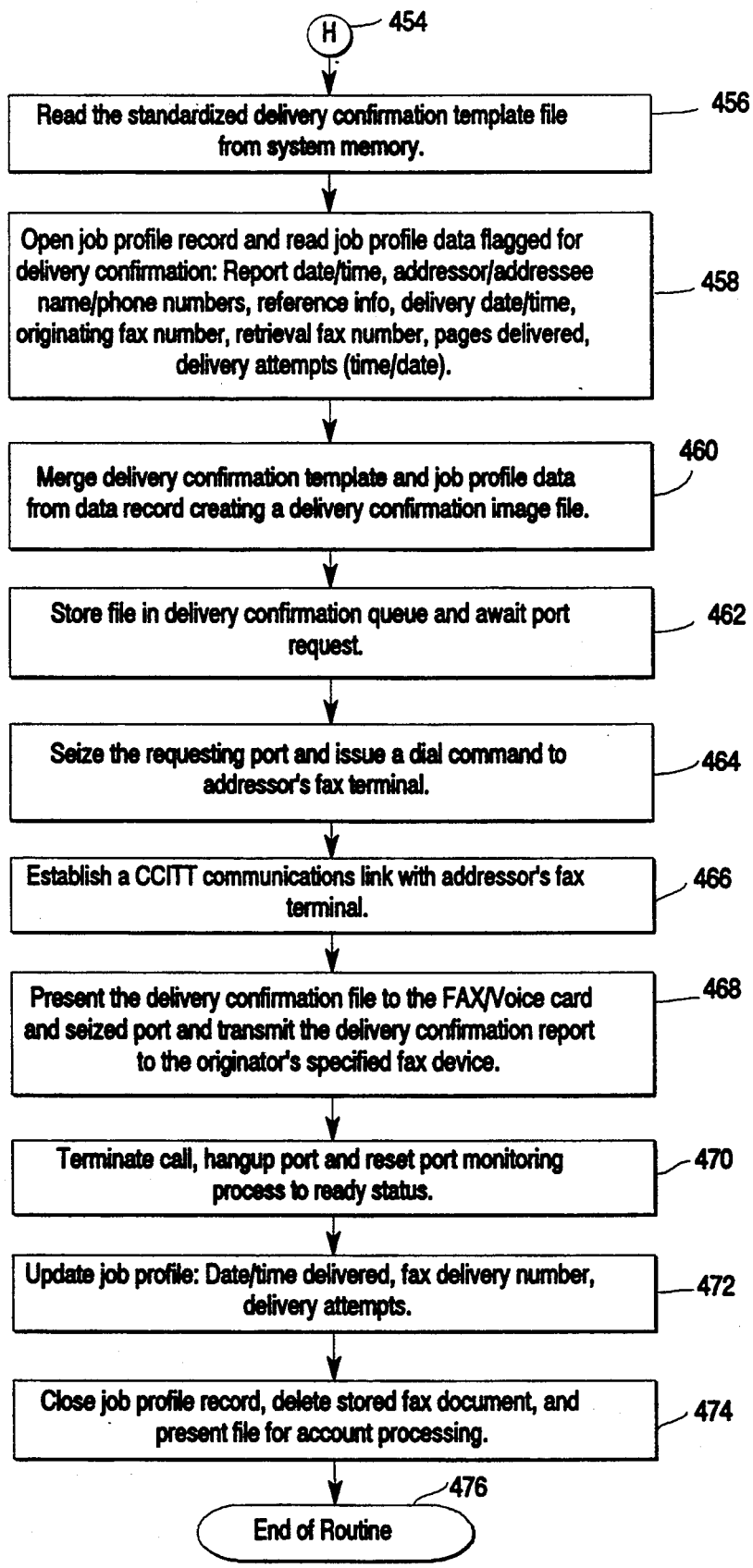
Figure 14:
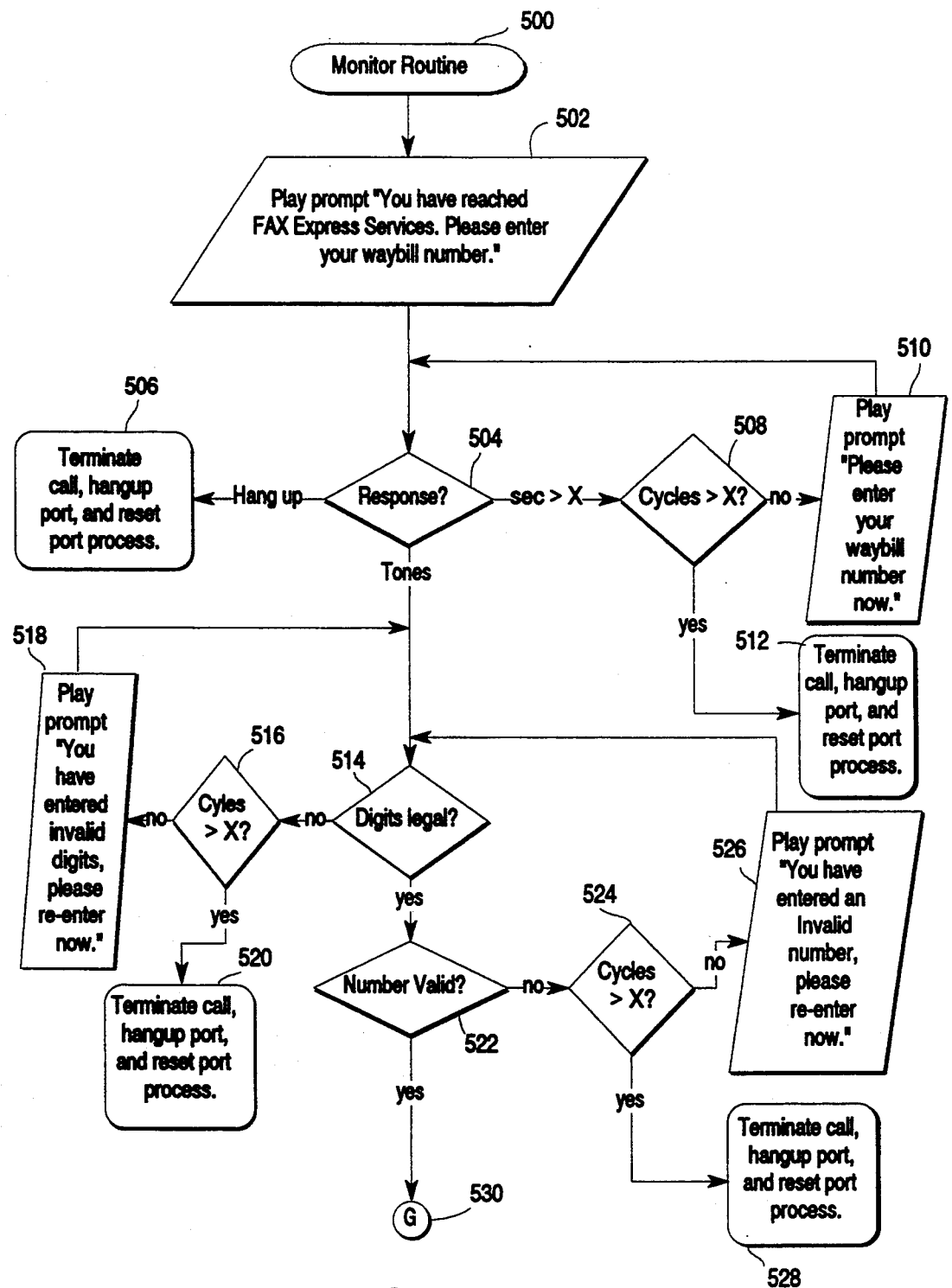
Figure 15:
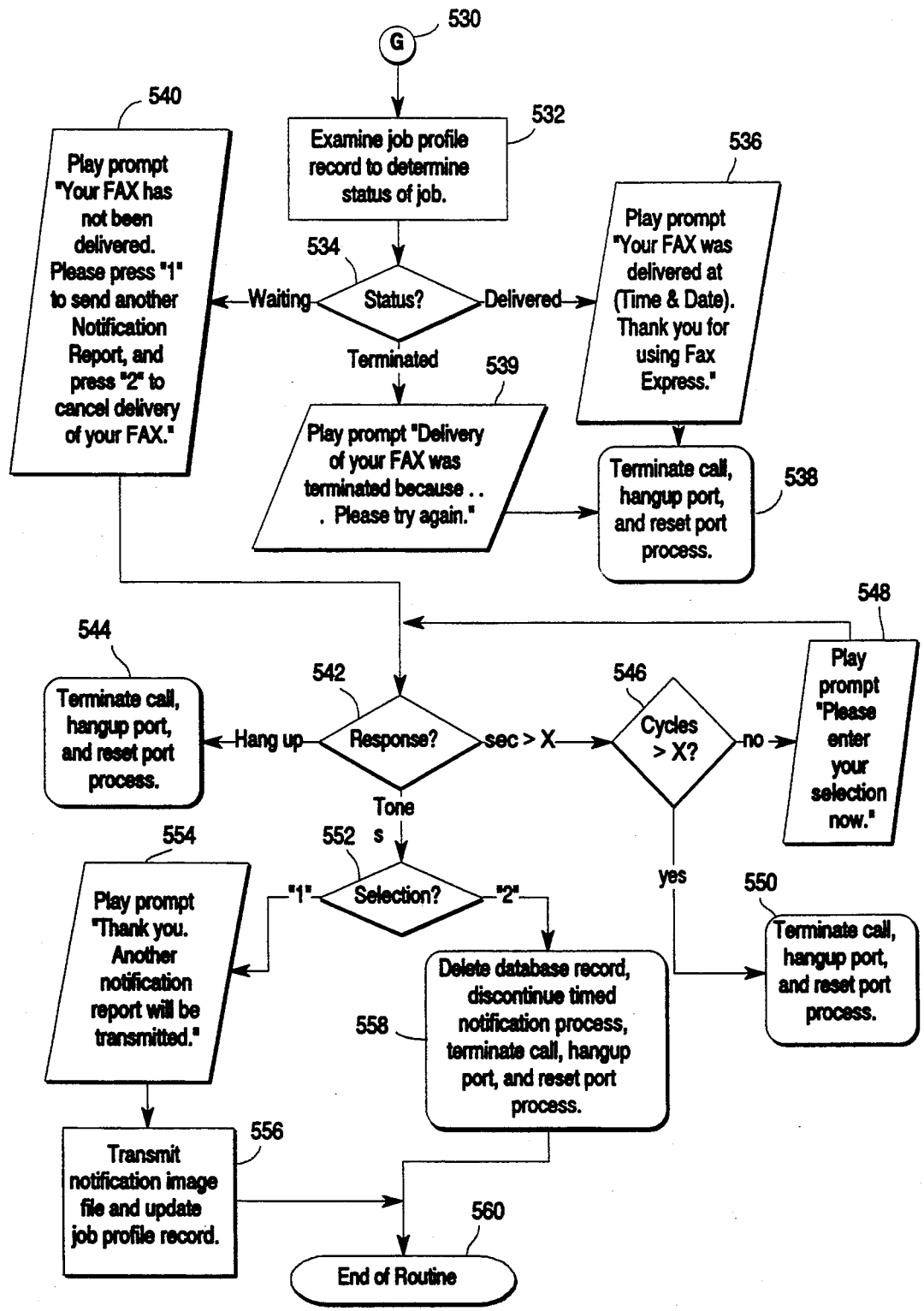

Referring now to FIG. 12, the intended recipient is next prompted to prepare to receive facsimile information which is subsequently transmitted to the intended recipient upon recognition of appropriate facsimile tone, steps 436-448. The sender data transmitted to the intended recipient corresponds to all of the sender facsimile data except the data representing the waybill form image. The job profile record is then updated, step 450, and a delivery confirmation routine initiated, step 452. Referring to FIG. 13, the delivery routine, in manner similar to the above notification routine, begins by, in step 456, reading a standardized delivery confirmation template file from the mass storage system 64 (FIG. 1), reading certain fields in the job profile record according to step 458, and, according to step 460, merges the standard delivery confirmation template file with the selected job profile record fields to create a delivery confirmation image file which, when transmitted and output from a facsimile terminal 16a according to steps 462-470, resembles the sample delivery report 210 of FIG. 6. After transmission, the F-SAFF 10 closes the job profile record, deletes the stored sender facsimile image data, and presents the job profile record information for account processing, steps 472 and 474.

The F-SAFF 10 of the preferred embodiment of the present invention also provides a monitoring service whereby delivery status information is made available to the sender. Upon receiving a call and beginning a deliver routine (based upon a recognition of the number dialed by the sender through steps 212-218, 222 of FIG. 7), the F-SAFF 10 plays an audio prompt asking the sender to enter the waybill number, step 502. If the sender is ultimately unable to provide the waybill number, through pressing keys on the telephone 28a (FIG. 1), the process is terminated, port reset, etc., as indicated in steps 504–528. After receiving the waybill number from the sender at step 532 in FIG. 15, the F-SAFF 10 determines the status of the job by referring to the job profile record associated with that waybill number. If the sender facsimile information has already been delivered, the sender is so advised, as shown in steps 536 and 538. If the sender facsimile information has not been delivered because the process was terminated, the sender is advised of the reason for termination, step 539. If the F-SAFF 10 is still waiting to deliver the sender facsimile information, the sender is given the option of canceling delivery of the information or having another notification report transmitted, steps 540–560.

While the embodiments of the present invention which have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below.

I claim:

1. A method for enhancing communication of sender facsimile data between a sender at a transmitting facsimile machine and an intended recipient at a receiving facsimile machine, said method comprising the steps of:

receiving sender facsimile data transmitted by a sender from a transmitting facsimile machine;

storing the sender facsimile data;

analyzing at least a portion of the sender facsimile data to identify a notification facsimile telephone number and a confirmation facsimile telephone number;

transmitting generated notification facsimile data to a facsimile machine at the notification facsimile telephone number, including steps of randomly generating a confidential retrieval code and including the confidential retrieval code in tile notification facsimile data to appear on output of the facsimile machine at the notification facsimile telephone number;

transmitting at least a portion of the sender facsimile data to a receiving facsimile machine during a telephone call from an intended recipient at the receiving facsimile machine upon receiving the confidential retrieval code from the intended recipient during the telephone call; and transmitting generated confirmation facsimile data to a facsimile machine at the confirmation facsimile telephone number after transmitting the sender facsimile data to the receiving facsimile machine.

2. A method for enhancing communication of sender facsimile data between a sender at a transmitting facsimile machine and an intended recipient at a receiving facsimile machine, said method comprising the steps of:

receiving sender facsimile data transmitted by a sender from a transmitting facsimile machine, wherein the sender facsimile data includes data representing a confidential retrieval code;

storing the sender facsimile data;

analyzing at least a portion of the sender facsimile data to identify a notification facsimile telephone number, a confirmation facsimile telephone number and the confidential retrieval code;

transmitting generated notification facsimile data to a facsimile machine at the notification facsimile telephone number;

transmitting at least a portion of the sender facsimile data to a receiving facsimile machine during a telephone call from an intended recipient at the receiving facsimile machine upon receiving the confidential retrieval code from the intended recipient during the telephone call; and transmitting generated confirmation facsimile data to a facsimile machine at the confirmation facsimile telephone number after transmitting the sender facsimile data to the receiving facsimile machine.

3. A method for enhancing communication of sender facsimile data between a sender at a transmitting facsimile machine and an intended recipient at a receiving facsimile machine, said method comprising the steps of:

receiving sender facsimile data transmitted by a sender from a transmitting facsimile machine;

storing the sender facsimile data;

analyzing at least a portion of the sender facsimile data to identify a notification facsimile telephone number and a confirmation facsimile telephone number, including analyzing at least a portion of the sender facsimile data in an attempt to identify a confidential retrieval code;

transmitting generated notification facsimile data to a facsimile machine at the notification facsimile telephone number, including, contingent upon not identifying a confidential retrieval code from the sender facsimile data, the steps of randomly generating a confidential retrieval code and including the randomly generated confidential retrieval code in the notification facsimile data to appear on the output of the facsimile machine at the notification facsimile telephone number;

transmitting at least a portion of the sender facsimile data to a receiving facsimile machine during a telephone call from an intended recipient at the receiving facsimile machine upon receiving a confidential retrieval code from the intended recipient during the telephone call; and transmitting generated confirmation facsimile data to a facsimile machine at the confirmation facsimile telephone number after transmitting the sender facsimile data to the receiving facsimile machine.

4. A facsimile store and forward facility for enhancing communication of sender facsimile data through a public switched telephone network between a sender at a transmitting facsimile machine and an intended recipient at a receiving facsimile machine, said facility comprising:

a telephone connection means for connecting said store and forward facility through a public switched telephone network to a transmitting facsimile machine and a receiving facsimile machine;

a storage means connected to said telephone connection means for storing sender facsimile data received from said transmitting facsimile machine through said public switched telephone network and said telephone connection means;

a recognition means connected to said storage means for recognizing characters in said sender facsimile data including, at least, a means for recognizing a notification facsimile telephone number and a confirmation facsimile telephone number; and a control means for controlling said facsimile store and forward facility, said control means including, at least, a notification means for generating notification facsimile data and for transmitting said notification facsimile data to a facsimile machine at said notification facsimile telephone number, wherein said notification means includes, at least, a retrieval code means for randomly generating a confidential retrieval code and for including said confidential retrieval code with said notification facsimile data to appear on output from said facsimile machine at said notification facsimile telephone number, a delivery means for transmitting at least a portion of said sender facsimile data to a receiving facsimile machine during a telephone call frown an intended recipient at said receiving facsimile machine, said delivery means including, at least, a security means for requiring the intended recipient to supply the confidential retrieval code before any portion of said sender facsimile data is subsequently transmitted to said receiving facsimile machine, and a confirmation means responsive to said delivery means for generating confirmation facsimile data and for transmitting said confirmation facsimile data to a facsimile machine at said confirmation facsimile telephone number.

5. A facsimile store and forward facility for enhancing communication of sender facsimile data through a public switched telephone network between a sender at a transmitting facsimile machine and an intended recipient at a receiving facsimile machine, said facility comprising:

a telephone connection means for connecting said store and forward facility through a public switched telephone network to a transmitting facsimile machine and a receiving facsimile machine;

a storage means connected to said telephone connection means for storing sender facsimile data received from said transmitting facsimile machine through said public switched telephone network and said telephone connection means;

a recognition means connected to said storage means for recognizing characters in said sender facsimile data including, at least, a means for recognizing a notification facsimile telephone number, a confirmation facsimile telephone number, and a confidential retrieval code; and a control means for controlling said facsimile store and forward facility, said control means including, at least, a notification means for generating notification facsimile data and for transmitting said notification facsimile data to a facsimile machine at said notification facsimile telephone number, wherein said notification means includes, at least, a retrieval code means responsive to said recognition means not recognizing said confidential retrieval code in said sender facsimile data for randomly generating said confidential retrieval code and for including said confidential retrieval code with said notification facsimile data to appear on output from said facsimile machine at said notification facsimile telephone number a delivery means for transmitting at least a portion of said sender facsimile data to a receiving facsimile machine during a telephone call from an intended recipient at said receiving facsimile machine, said delivery means including, at least, a security means for requiring the intended recipient to supply the confidential retrieval code before any portion of said sender facsimile data is subsequently transmitted to said receiving facsimile machine, and a confirmation means responsive to said delivery means for generating confirmation facsimile data and for transmitting said confirmation facsimile data to a facsimile machine at said confirmation facsimile telephone number.

* * * * *